(No Model.)
W. C. BOONE & W. A. WHITFIELD.
BEER TAP.
No. 277,872. Patented May 22, 1883.
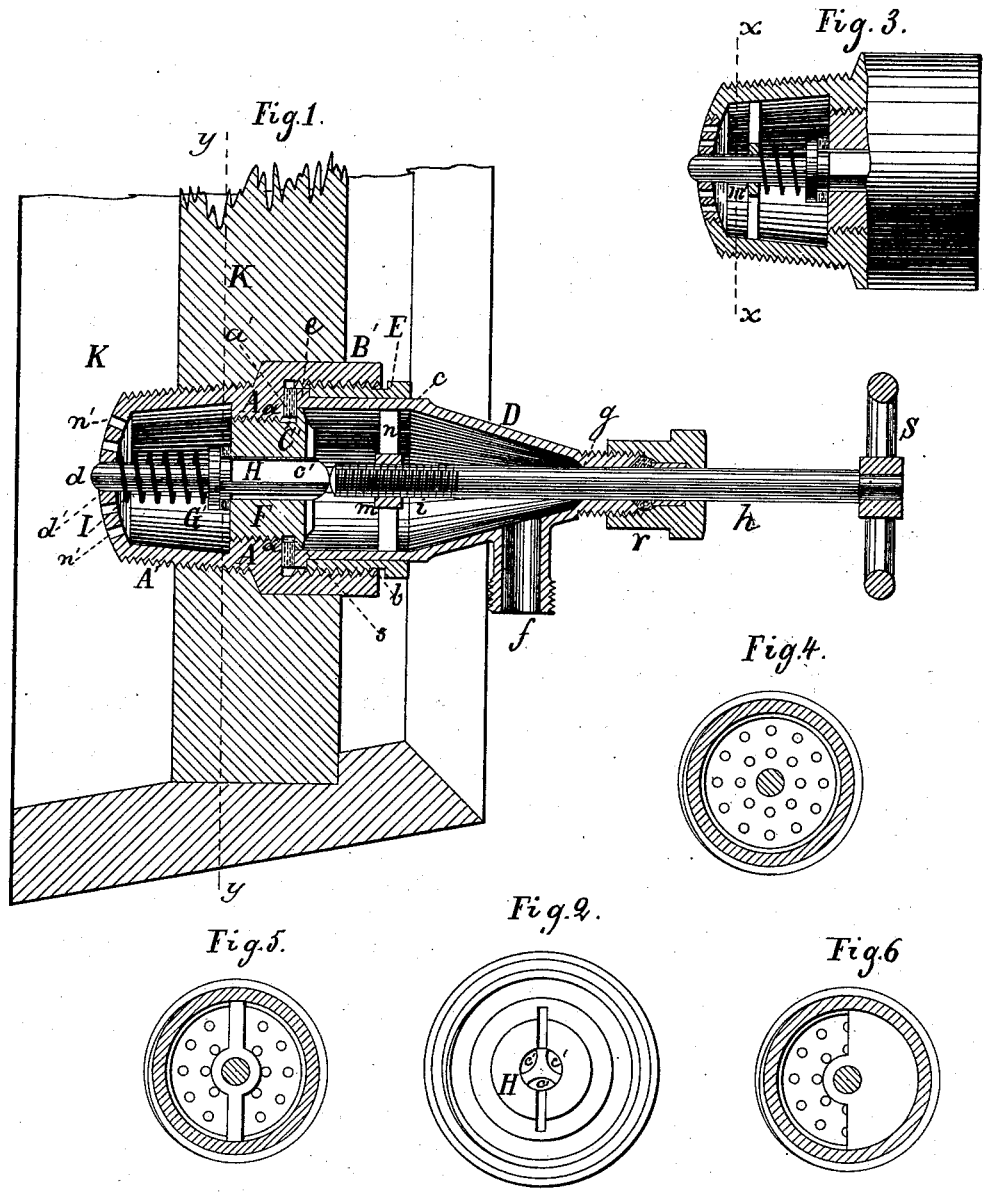
Witnesses
Rudolf B. Kjellman
Thomas E. Crossman
Inventors
William C. Boone,
William A. Whitfield
By James A. Whitney
Attorney

UNITED STATES PATENT OFFICE.

WILLIAM C. BOONE AND WILLIAM A. WHITFIELD, OF BROOKLYN, N. Y.

BEER-TAP.

SPECIFICATION forming part of Letters Patent No. 277,872, dated May 22, 1883.

Application filed January 2, 1883. (No model.)

*To all whom it may concern:*

Be it known that we, WILLIAM C. BOONE and WILLIAM A. WHITFIELD, both of Brooklyn, in the county of Kings and State of New York, have invented certain Improvements in Beer-Taps, of which the following is a specification.

In beer-taps as ordinarily constructed the valve which controls the exit of the liquid works within a narrow tube or sleeve, which affords but a slight annular space for the passage of the liquid, so that in case the valve swells—a very common occurrence—the passage is obstructed and the device rendered nearly or quite useless for the purposes for which it is designed. Furthermore, such beer-taps are comparatively complicated, expensive, and liable to get out of order.

The object of our invention is to provide an apparatus of the class specified which will be free from the drawbacks referred to, and which can be manufactured and applied to use at a moderate cost and with the exercise of merely ordinary mechanical skill.

The invention comprises certain novel combinations of parts whereby said objects are effectually secured.

Figure 1 is a central longitudinal sectional view of an apparatus constructed according to our invention and applied to use on a cask or barrel. Fig. 2 is an end view, as seen from the right of Fig. 1, of certain parts of said apparatus. Fig. 3 is a side view and partial section of a portion of said apparatus, including a modification thereof. Fig. 4 is a transverse sectional view taken in the line $x\,x$ of Fig. 3. Fig. 5 is a transverse sectional view taken in the line $y\,y$ of Fig. 1. Fig. 6 is a sectional view, seen from the right-hand side, showing a modification in said apparatus.

A is the bushing, composed of the inner tapering externally-threaded part, A', and the outer circular or cylindrical enlarged portion, B'. The part A' is screwed into a suitably-shaped socket formed in the side of the barrel or cask C, while the part B' fits into a circular rabbet at the outer portion of the socket aforesaid, all as will be understood by reference to Fig. 1. The bushing A is provided internally with a fixed nut, $a$. Its outer portion, B', is also provided with an internal screw-thread, $b$. Upon the shoulder $a'$ of the nut $a$ is placed an annular washer or packing-ring, C', and upon this rests the circumferentially-flanged inner end of a tapering shell, D, the inner portion of which is cylindrical, as shown at $c$. An externally-threaded sleeve or annular nut, E, is screwed into the internal screw, $b$, of the part B' of the bushing A in such manner that, bearing upon the circumferential flange $e$ of the shell D, it holds the same snugly upon the shoulder $a'$, with the packing-ring C' interposed, the shell being thereby firmly connected with the bushing. The shell is provided with a suitable outlet-passage, $f$. At its outer extremity it is narrowed to provide a guide or bearing, $g$, for the valve-actuating stem $h$, which latter is provided with a screw-thread, $i$, at its inner end, which works through a fixed nut, $m$, secured upon or formed in a cross-piece, $n$, provided internally to the shell D, the outer extremity of the latter being externally threaded to receive a gland, $r$, which compresses the packing-ring around the valve-actuating stem $h$, to prevent leakage from the end of the shell D. Screwed into the nut $a$ of the bushing is a block, F, which has at its outer end a flange, $s$, which rests upon the inwardly-projecting edge of the packing-ring C', so that the block F is firmly and tightly held in place.

G' is the valve, provided upon the valve-stem H, which is longitudinally grooved, as shown at $c'$, in such manner that when the valve G' is forced away from its seat on the inner surface of the block F liquid may pass from the part A' through the passages afforded by the said groove $c'$, thence to the interior of the shell D, and thence out through the opening $f$. The valve-stem H is provided with an axial rod or extension, $d$, around which, between the valve itself and the inner end of the part A' of the bushing, is a spiral spring, I, which tends to force the valve against its seat, and thereby shut off the exit of the liquid from the part A' of the bushing to and through the passages provided by the groove $c'$ of the valve-stem H. The innermost end of the part A' of the bushing is provided with one or more openings, through which the liquid may pass direct from the interior of the cask or barrel K into the part A' of the bushing. These openings may be either small holes $n'$, as shown in Fig. 1, or may comprise a circular opening, as represented in Fig. 3; or they may be of any other suitable form or arrangement to permit access of the liquid from the interior of the barrel to the interior of the part A'. The outermost end of the actuating valve-stem h is provided with a hand-wheel, S, by which it may be turned in one direction to force inward the valve-stem H, to permit the exit of the liquid, or in a reverse direction to permit the closing of the valve to shut off the exit of the liquid.

It will be observed that inasmuch as the interior of the part A' constitutes a chamber of relatively great magnitude, within which plays the valve G', the latter by its swelling or expansion cannot in anywise materially interfere with the outflow of the liquid to the passages afforded by the groove c' in the valve-stem.

It is to be understood that when the openings through which the liquid is allowed to pass into the bushing are so arranged as to render the bearing or support d' of the rod or extension d inadmissible, then in that case a cross-piece may be provided within the part A', having at its center a suitable bearing, m', to receive and sustain the said rod or extension, as represented in Fig. 3.

What we claim as our invention is—

1. In a beer-tap, the bushing A, having the externally-threaded part a', constituting internally a chamber, and having at its inner end not only inlets for the passage of the liquid, but a guide or bearing, a', the fixed nut a, and internal nut, s, in combination with the threaded block F, the longitudinally-grooved valve-stem H, the valve G', and the rod or extensions d, the latter passed through the bearings d', all substantially as and for the purpose herein set forth.

2. In a beer-tap, the bushing A, having the externally-threaded inner portion, A', constituting internally a chamber, and at its inner end provided with one or more openings through which the liquid may have access thereto, the internal fixed nut a, and the internal screw-thread, s, in combination with the threaded block F, the shell D, having the internal fixed nut m, the threaded valve-actuating stem h, working through the said nut m, the longitudinally-grooved valve-stem H, having the valve G', and the spring I, the whole combined, constructed, and arranged for joint use and operation, substantially as and for the purpose herein set forth.

3. The bushing A, having the externally-threaded part A', constituting internally a chamber, and having at its inner end not only inlets for the passage of the liquid, but a guide or bearing, d', fixed nut a, and internal thread, s, in combination with the threaded block F, the longitudinally-grooved valve-stem H, having the valve G' and rod or extension d, the latter passed through the bearings d', the spring I, for forcing the valve to its seat, the shell D, having the nut m, and the threaded valve-actuating stem h, passed through the nut m, and arranged to actuate the valve-stem H to move the valve and the rod or extension d to give stability to the said valve in its movement, all substantially as and for the purpose herein set forth.

WILLIAM C. BOONE.
WILLIAM A. WHITFIELD.

Witnesses:
THOMAS E. CROSSMAN,
RUDOLF H. KJELLMAN.